Feb. 15, 1955
A. A. KASPER
2,702,272
ELECTROLYTICALLY CONDUCTIVE MEMBRANE
Filed June 2, 1951
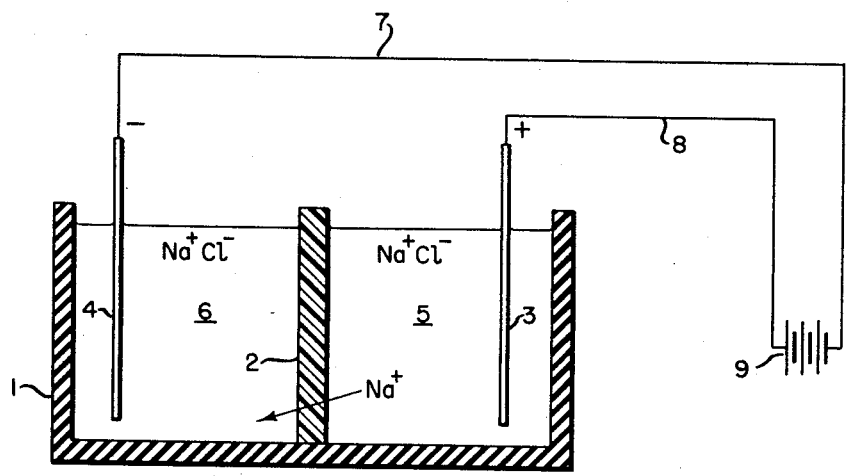
*INVENTOR.*
ANDREW A. KASPER
BY
ATTORNEYS

United States Patent Office 2,702,272
Patented Feb. 15, 1955

2,702,272

ELECTROLYTICALLY CONDUCTIVE MEMBRANE

Andrew A. Kasper, Watertown, Mass., assignor to Ionics, Incorporated, Cambridge, Mass., a corporation of Massachusetts Application June 2, 1951, Serial No. 229,586

5 Claims. (Cl. 204—151)

This invention relates to electrically conductive solid materials having ionic selectivity and substantial cation exchange capacity, and in particular to hydrous synthetic organic electrolytic polymers which are condensation products of sulfonated resorcinol or sulfonated methylolforming resorcinol derivatives with aldehydes, and to methods of preparing them.

Until recently, solid materials, particularly synthetic organic resins, having substantial ion exchange capacity were obtainable only in particulate form, such as granules or beads. The copending application of Walter Juda and Wayne A. McRae, Serial No. 103,784, filed July 9, 1949, now Patent No. 2,636,581, issued April 28, 1953, describes synthetic polymeric materials in the form of hydrous gels which may be formed into such large-dimensioned structures as membranes, tubes, rods, vessels and the like. These materials, like ion-exchange resins, include in their polymeric structure dissociable ionizable radicals, one ionic component of which is fixed into or retained by the polymeric matrix and at least one component of which consists of a mobile and replaceable ion electrostatically associated with the fixed component. The ability of the mobile ion to be replaced, under appropriate concentration conditions, by ions of the same charge, imparts ion exchange characteristics to these materials.

More important, however, is the effect the fixed radicals have on the electro-conductive properties of these materials. The fixed ions possess electrostatic charges attractive to the mobile ions and other ions of like charge, and which tend to repel ions of the opposite charge, that is, ions of the same charge as the fixed ions. Under the influence of an electric field, ions charged like the mobile ions may be caused to permeate the material exclusively of ions of the opposite charge, which are repelled. These materials are accordingly electrically conductive and selectively permeable.

The present invention comprises polymeric solid material of the general characteristics of those described by Juda and McRae, and provides coherent homogeneous solids which are highly conductive and selectively permeable to cations and which also have substantial cation exchange capacity. It is further a feature of the materials of this invention that they are mechanically durable, so that they may be formed into self-sustaining structures, and are substantially hydraulically impermeable under ordinary pressure differentials, so that they may be used effectively as hydraulic separators. These materials may be used in dialysis and electrodialysis apparatus where advantage may be taken of their selectively permeable and highly conductive properties. Several such arrangements are described in the above-identified application of Juda and McRae.

According to the process of this invention, a methylolforming sulfonated resorcinol or resorcinol derivatives with or wtihout sulfonated phenol and an aldehyde are caused to condense under acid conditions while maintained in an aqueous dispersion under conditions which prevent substantial evaporation of water. Condensation is effected by any of the well-known expedients as, for instance, by heat, pressure or catalytic accelerators, and is continued until a water insoluble, infusible, hydrous gel is formed.

By maintaining aqueous dispersion conditions throughout the polymerization (condensation), there results a solid gel containing a continuous water phase which retains the form of the dispersed mass and which is further more a coherent and homogeneous structure. The presence of the water phase appears to be effective in orienting the sulfonated component in a dissociable position, and provides a medium in which dissociation may occur, resulting in a solid structure which is electrically conductive and selectively permeable to cations.

It has been found that in order to attain these desirable characteristics, the water should be present in the dispersion in an amount of at least 30 per cent by weight based on the weight of condensed solid material after drying to constant weight at 105° C., and should not at any time, either during the condensation or afterwards, be reduced. Permitting the water content to become lower is likely to cause cracking and impairment of the electrical properties of the material. Although a minimum water content of 30 per cent has been found effective for the purposes of this invention, preferred embodiments include much larger amounts, between 100 and 200 per cent, and may include such larger amounts as do not interfere with the physical structure of the solid. Structures including as much as 300 per cent water have been found entirely satisfactory.

The ordinary curing conditions, previously used, in which water is allowed to escape or evaporate, do not result in the formation of continuous coherent and homogeneous structures which are selectively permeable and electrically conductive. Either a continuous resinous dielectric structure results, as is typified by the well-known phenolic molding resins, or a fractured or particulate structure results which is typified by the granular ion-exchange resins.

The products produced in accordance with this invention have been found to have high electrical conductivities, generally in excess of $5 \times 10^{-3}$ ohm$^{-1}$ cm.$^{-1}$. They are substantially selectively permeable to cations as indicated by the fact that in the standard concentration cell

| calomel electrode | sat'd KCl bridge | 0.1 N KCl | membrane | 0.01 N KCl | sat'd KCl bridge | calomel electrode |
|---|---|---|---|---|---|---| at 25° C., a characteristic concentration potential approaching the thermodynamic ideal of 55.1 millivolts may be measured. The ion exchange capacity of these materials is in excess of 0.3 milliequivalents per grams of solid material after drying to constant weight at 105° C., and they possess hydraulic resistivities in excess of $10^2$ atm. sec. cm.$^{-2}$ (the pressure in atmospheres required to cause liquid to permeate a centimeter cube of the material at the rate of one cubic centimeter per second).

Structures may be formed in accordance with this invention by casting or molding (including pressure molding) the aqueous acid dispersion of polymerizable ingredients and causing polymerization in the mold while preventing the evaporation or escape of substantial amounts of water, for instance, by closing the mold or by otherwise carrying out the polymerization under substantially saturated aqueous conditions. In this way forms and structures may be obtained in any desired shape or size, including structures having at least one and preferably two dimensions greater than ¼ inch, and which are accordingly far greater in size than structures in which conventional ion exchange materials have been made in the past. Such cast or molded structures may, if desired, be further formed as by machining or grinding.

Resorcinol derivatives which may be used include in addition to resorcinol itself, the 5-substituted derivatives having the general formula

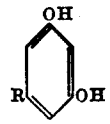

where R represents hydroxyl, chlorine, bromine, carboxylic acid, methoxyl, ethoxyl, methyl, ethyl, and phenyl and also other resorcinol derivatives capable of forming water soluble sulfonic acids which have two hydrogen atoms susceptible to methylol formation. Such resorcinol derivatives are, for example, 3,5-dihydroxy benzenecarboxylic acid, orcinol, etc. The resorcinol component may be sulfonated by conventional processes using sulfonating agents such as sulfuric acid, chlorsulfonic acid, and sulfur trioxide. Suitable methods will be illustrated in the examples. In this connection it is not necessary for the manufacture of useful products in accordance with this invention that all of the resorcinol or resorcinol derivatives be sulfonated.

Methylol formation occurs when a phenol or similarly active compound having a hydrogen atom in the ortho or para position with respect to a hydroxyl group and which is not otherwise deactivated, as by the influence of other groups, is caused to react with formaldehyde. As an example, in the reaction between phenol and formaldehyde, the first reaction products are ortho and para hydroxybenzyl alcohol

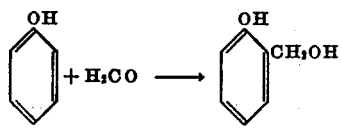

and

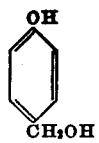

which contains the methylol group —$CH_2OH$. The preferred resorcinol derivative is resorcinol itself. Phenol may be incorporated in conjunction with the resorcinol derivatives in amounts less than 90 mol per cent of phenol on the basis of the number of moles of phenol and resorcinol derivative. Mixtures of resorcinol and resorcinol derivatives are often advantageous, having improved mechanical and electrolytic properties.

The aldehydes which may be used include all those which can be caused to condense with methylol-forming phenols, such as formaldehyde, acetaldehyde, furfural, and the like. Formaldehyde is preferred because of the short cross-links which it forms on condensation. It may be used in its gaseous form, but it is far more convenient to use its aqueous solution, or materials which are readily decomposable to formaldehyde such as paraformaldehyde, metaformaldehyde, hexamethylenetetramine, and the like.

The rate of condensation of sulfonated resorcinol or resorcinol derivatives with aldehydes may be decreased and controlled by partially neutralizing the sulfonated resorcinol, for example, with sodium hydroxide or ammonia. Aqueous solutions of sulfonated resorcinols and aldehydes which polymerize too rapidly to be easily cast except at inconveniently low temperatures may be controlled by this partial neutralization. However, for best results, the pH of polymerizing solution should be less than 2. Products prepared from partially neutralized sulfonated resorcinol derivatives are equivalent to those prepared from sulfonated derivatives which are not partially neutralized.

The proportions in which the ingredients should be combined are most accurately described in molar quantities. Preferably, there are employed from 0.8 to 1.2 mols of sulfonating agent per total number of mols of resorcinol and resorcinol derivatives, and more than 1.3 but less than 2.0 mols of aldehyde per total number of mols of resorcinol and resorcinol derivatives. (If phenol is used in conjunction with resorcinol and resorcinol derivatives, the ratio of sulfonating agent and aldehyde is calculated on the basis of the total number of mols of phenol, resorcinol, and resorcinol derivatives.) Combinations outside these proportions may be used to produce large structures according to this invention with some sacrifice of the desirable characteristics. For instance, the ratio of sulfonating agent to resorcinol may be expanded to 1.5. However, low conductivity results when lesser sulfonating agent than recommended is used. Furthermore it has been found that increasing the ratio of sulfonating agent does not generally result in a corresponding increase in active groups in the polymerized product. For example, for resorcinol based products, only about 0.3 mol of sulfonating agent is retained in the polymerized structure per mol of resorcinol in the range of 1.0 to 1.5 mols of sulfonating agent per mol of resorcinol. In other words increasing the sulfonating agent from 1.0 to 1.5 mols per mol of resorcinol results in no substantial increase in the amount of sulfonic acid retained in the polymer. The ingredients should be combined by mixing the sulfonating agent and resorcinol derivatives thus forming at least in part a resorcinol sulfonic acid. The sulfonated resorcinol should then be combined with the aldehyde below room temperature to form an aqueous solution, either by adding them to water or by mixing an aqueous solution of one with the other. While the mixture is still fluid, it is appropriately shaped as by molding, and cured under non-evaporating conditions by the application of heat.

The following examples describe in detail representative products and methods of making them in accordance with this invention. The examples have been selected for purposes of illustration and are not presented to suggest limitations not previously described and not included in the appended claims.

In the accompanying drawings, the figure is a diagrammatic elevation in cross section of an electrodialytic cell containing a membrane produced in accordance with the invention.

EXAMPLE 1

| | Parts by weight |
|---|---|
| Resorcinol | 55 |
| Phenol | 47 |
| Sulfuric acid (96%) | 103 |
| Formaldehyde (37% in water) | 131 |
| Water | 33 |

The resorcinol and phenol were melted together at a temperature of 100° C., and then cooled to 60° C., and the sulfuric acid was added. The temperature was raised by this addition to 105° C. Over the course of twenty minutes, the sulfonated mixture was allowed to cool to 50° C. and the water was then added. The formaldehyde was cooled to a temperature of —10° C. The sulfonate was added to the cold formaldehyde with stirring. The addition was done slowly over the course of thirty minutes maintaining the temperature between 0° C. and —5° C. The resulting liquid was cast between two glass plates around a Saran (polyvinylidine chloride) screen. It was then cured at 80 to 85° C. for three hours in an oven having an atmosphere saturated with water vapor. After curing, the cast was leached in distilled water.

EXAMPLE 2

| | Parts by weight |
|---|---|
| Resorcinol | 110 |
| Sulfuric acid (96%) | 90 |
| Formaldehyde (37% in water) | 140 |
| Water | 40 |

The resorcinol was added in ten portions with stirring to the sulfuric acid over the course of one minute maintaining the temperature at less than 45° C. The mixture was then raised to 65° C., and maintained at this temperature with stirring until the resorcinol dissolved. The temperature was then reduced to 20° C. and the water added. The resulting solution was then added at this temperature in ten portions to formaldehyde at —10° C. with stirring, maintaining the temperature always below —5° C. The resulting liquid was cast between two glass plates over a Saran screen and then cured at 85° C. for three hours in an oven having an atmosphere saturated with water vapor. After curing, the cast was leached in distilled water.

The physical characteristics of the membranes produced in the above example are set forth in Table I. The moisture content was obtained by drying a specimen in the hydrogen form to constant weight at 105° C. and expressing the loss of weight as per cent of the 105° C. dried material. The ion exchange capacity was determined by bringing a specimen in equilibrium with a 4 N hydrochloric acid solution, then leaching repeatedly in distilled water to remove adsorbed hydrochloric acid, and finally removing all hydrogen by soaking the membranes repeatedly in 4 N sodium chloride solutions until equilibrium is reached, and titrating that solution for hydrogen. The capacity is expressed as in the number of milliequivalents of hydrogen removed by the sodium chloride per 105° C. dried gram of material in the hydrogen form.

The concentration potential was measured in a concentration cell with the membrane separating a 0.60 N sodium chloride solution and a 0.30 N sodium chloride solution, between calomel electrodes connected through saturated potassium chloride salt bridges. The membrane was equilibrated in a 4 N sodium chloride solution, leached in distilled water, and equilibrated in a 0.60 N sodium chloride solution prior to insertion in the cell. The respective solutions in the cell were continuously renewed to maintain the concentrations. The values recorded in Table I are the open circuit potentials after steady conditions were attained. In such a cell the thermodynamically ideal concentration potential is 17 millivolts. It will be seen from Table I that this standard was consistently approached.

The electrical conductivity was measured by forming from a leached membrane a strip 10 cm. long and 1 cm. wide, clamping the ends to copper electrodes and measuring the resistance to 60 cycle alternating current. The conductivity is the reciprocal of the resistivity.

In Example 1 above 50 mol per cent of phenol (on the the basis of the total number of mols of phenol and resorcinol) is used. By varying the mol per cent of phenol in a series of formulations similar to that used in Example 1, it was found that structures having 50 to 85 mol per cent of phenol have a good combination of electrochemical and mechanical properties, 75 mol per cent being preferred. Above 90 mol per cent of phenol, the desired electrochemical and mechanical properties are impaired.

In the foregoing examples, resorcinol itself was selected as the preferred and representative resorcinol compound, but it will be understood that these examples may be multiplied to great length by substituting those representative resorcinol derivatives described above, or similar resorcinol derivatives capable of forming methylol-forming resorcinol sulfonic acids for the resorcinol of the examples. Similarly, formaldehyde has been selected, but it may be replaced by other aldehydes capable of condensing with resorcinol as furfural, acetaldehyde, benzaldehyde and the like. Broadly this invention and a general description of the methods of practicing it are set forth in the specification immediately preceding the specific examples.

Table I

| Example | Moisture, Percent | Capacity, m. eq./g. | Conc., E.M.F. | Cond., ohm$^{-1}$ cm.$^{-1}$ $\times 10^{-3}$ |
|---|---|---|---|---|
| 1 | 128 | 2.1 | 14 | 7 |
| 2 | 140 | 1.9 | 13 | 1.1 |

The following example illustrates the practical application of the structures of this invention in the treatment of liquids containing dissolved ionized substances.

EXAMPLE 3

The structures of the above examples may be tested for their water treating properties in a simple cell shown schematically in Figure 1. Solutions 0.03 N in sodium chloride (a concentration of dissolved substances often found in naturally occurring brackish waters) are held in a container, 1 separated into anode and cathode chambers, 5 and 6 respectively by electrolytically conductive structures, 2 prepared in accordance with the above examples. Graphite electrodes, 3 and 4, are present in the chambers, 5 and 6, and contact the sodium chloride solution contained within the chambers. Electrically conductive leads 7 and 8 connect the electrodes with a source of voltage, e. g., a D. C. battery 9 of such polarity that the electrode 3 is anodic. When an electric current is imposed, chlorine is evolved at electrode 3 and hydrogen at electrode 4. It is found that the current is carried across the structure 2 almost completely by sodium ions passing out of chamber 5 into chamber 6, thereby reducing the sodium ion content.

Having thus disclosed my invention, I claim as new and desire to secure by Letters Patent:

1. The method of forming a solid unfractured structure of sulfonated phenol-sulfonated resorcinol-aldehyde condensation products having at least two dimensions each in excess of 0.25 inch, and comprising as an essential part extending substantially throughout said structure a predominant amount of a cation-exchange resin comprising combining a sulfonated phenol and a material selected from the group consisting of a sulfonated resorcinol and sulfonated 5-substituted resorcinols having two hydrogen atoms susceptible to methylol formation, with an aldehyde in the molar ratio of 0.5 to 0.9 mol of phenol per mol of phenol plus resorcinol, or phenol plus substituted resorcinols, and 1.3 to 2.0 mols of aldehyde per mol of phenol plus resorcinol, or phenol plus substituted resorcinols, in water, and heating said combination to effect the condensation thereof to the water insoluble, infusible stage while maintained under conditions preventive of substantial evaporation of water, there being present throughout said condensation, at least 30% water (based on the weight of solid material after drying to a constant weight at 105° C.).

2. A method of forming a solid unfractured structure of sulfonated phenol-sulfonated resorcinol-formaldehyde condensation product having at least two dimensions each in excess of 0.25 inch and comprising as an essential part extending substantially throughout said structure a predominant amount of a cation-exchange resin comprising combining sulfonated resorcinol, sulfonated phenol, and formaldehyde in the molar ratios of 0.5 to 0.9 mol of phenol per mol of phenol plus resorcinol, and 1.3 to 2.0 mols of formaldehyde per mol of phenol plus resorcinol, in water, and heating said combination to effect condensation thereof to the water insoluble, infusible stage while maintained under conditions preventive of substantial evaporation of water, there being present throughout said condensation at least 30 per cent water (based on the weight of solid material after drying to a constant weight at 105° C.).

3. The method of treating aqueous media containing dissolved ionized substances to remove cations therefrom which comprises contacting such media with a cation-selective solid, homogeneous, coherent structure having at least two dimensions each in excess of 0.25 inch and having electrical conductivity in excess of $$5 \times 10^{-3} \text{ ohm}^{-1} \text{ cm.}^{-1}$$

and substantial cation permselectivity comprising a water insoluble infusible condensation polymer of sulfonated phenol and a materail selected from a group consisting of a sulfonated resorcinol and sulfonated 5-substituted resorcinol derivatives thereof having two hydrogen atoms susceptible to methylol formation, with formaldehyde combined in the molar ratios of 0.5 to 0.9 mol of phenol per mol of phenol plus resorcinol, or phenol plus substituted resorcinols and 1.3 to 2.0 mols of formaldehyde per mol of phenol plus resorcinol, or phenol plus substituted resorcinols in gel relationship with at least 30 per cent water (based on the weight of condensed solid material after drying to constant weight at 105° C.) said water presenting a continuous phase throughout said gel, and passing an electric current throughout such aqueous media and said structure to effect the migration of said cations from such aqueous media through said structure.

4. As an article of manufacture, a solid unfractured structure having at least two dimensions in excess of 0.25 inch and comprising as an essential part extending substantially throughout said structure a gel which is composed of a cation exchange resin which is a water insoluble, infusible condensation product of a mixture of sulfonated phenol and a material selected from the group consisting of sulfonated resorcinol and sulfonated 5-substituted resorcinols having two hydrogen atoms susceptible to methylol formation with an aldehyde combined in the molar ratio of 0.5 to 0.9 mol of phenol per mol of phenol plus resorcinol, or phenol plus substituted resorcinols in gel relationship with at least 30 per cent water (based on the weight of the solid material of the gel after drying to a constant weight at 105° C.) said water presenting a continuous phase throughout said gel.

5. As an article of manufacture, a solid structure in the form of a membrane or sheet comprising as an essential part extending substantially throughout said structure an unfractured gel which is composed of a cation exchange resin which is a water insoluble, infusible condensation product of a mixture of sulfonated resorcinol, sulfonated phenol and formaldehyde combined in the molar ratio of 0.5 to 0.9 mol of phenol per mol of phenol plus resorcinol, in gel relationship with at least 30 per cent water (based on the weight of the solid material of the gel after drying to a constant weight at 105° C.), said water presenting a continuous phase throughout said gel.

(References on following page)

References Cited in the file of this patent

UNITED STATES PATENTS

| | | |
|---|---|---|
| 2,191,853 | Holmes | Feb. 27, 1940 |
| 2,204,539 | Wassenegger | June 11, 1940 |
| 2,460,516 | Luaces | Feb. 1, 1949 |
| 2,546,938 | Bauman | Mar. 27, 1951 |
| 2,636,851 | Juda | Apr. 28, 1953 |

FOREIGN PATENTS

| | | |
|---|---|---|
| 713,093 | Germany | Oct. 9, 1941 |

OTHER REFERENCES

Nachod, Ion Exchange, pp. 48 to 50, published 1949 by Interscience Pub., New York.

Kunin, Ion Exchange Resins, p. 62, published 1950 by John Wiley & Sons, New York.

Ramondt, "Chemistry and Industry," Sept. 16, 1947, pp. 543–545.

"Nature," vol. 165, p. 568 (Apr. 8, 1950), article by Kressman.

"Helvetica Chimica Acta," vol. 23 (1940), pp. 795 thru 800; article by Meyer et al.